United States Patent Office 3,070,179
Patented Dec. 25, 1962

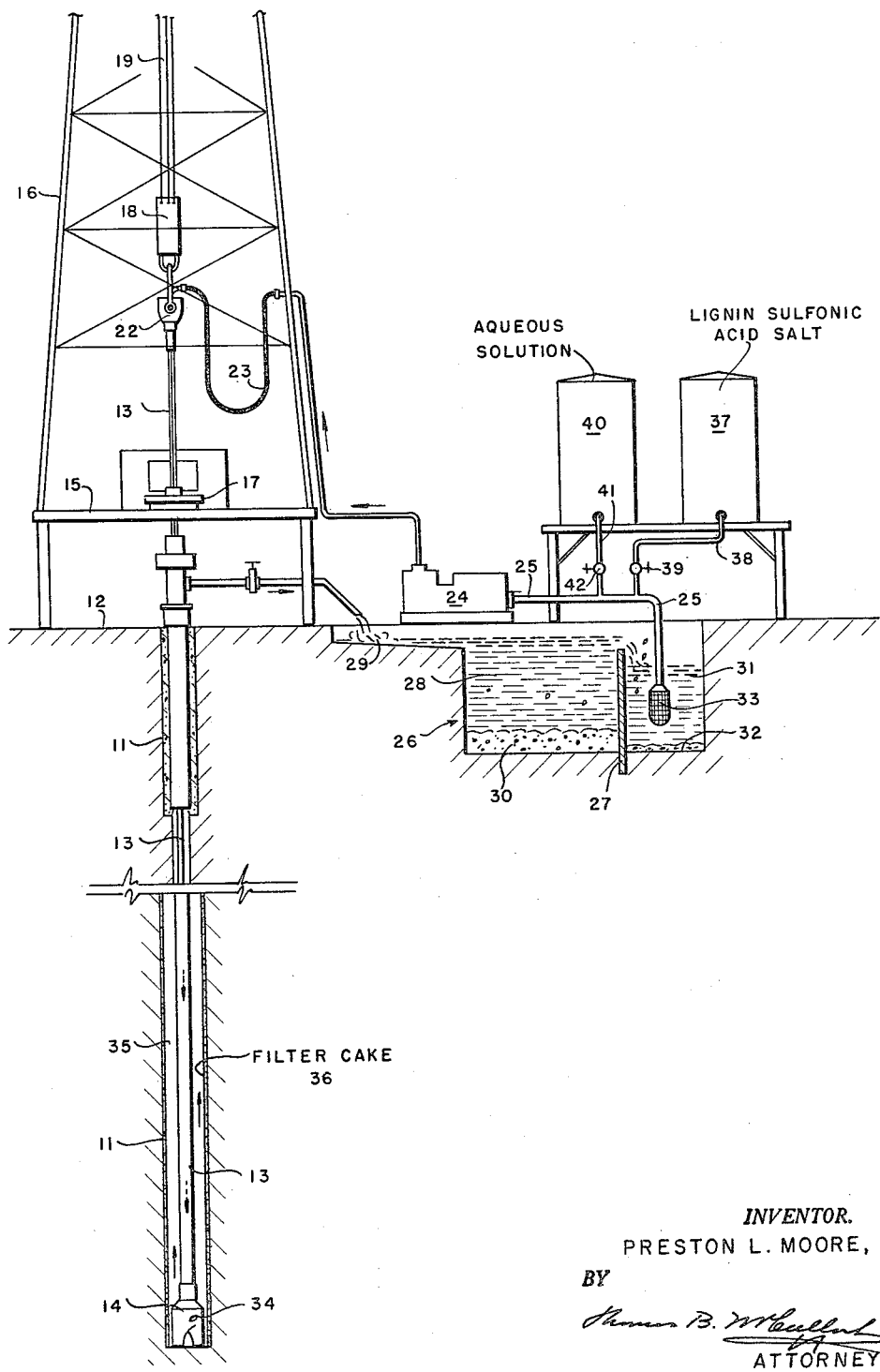

3,070,179
DRILLING OF WELLS
Preston L. Moore, Norman, Okla., assignor, by mesne assignments, to Jersey Production Research Company, Tulsa, Okla., a corporation of Delaware
Filed Nov. 2, 1959, Ser. No. 850,404
7 Claims. (Cl. 175—72)

The present invention is directed to a method of drilling a well. More particularly, the invention is concerned with drilling a well at increased drilling rates. In its more specific aspects, the invention is concerned with drilling a well with a solution which is free of suspended mud solids and from which suspended chips are removed.

The present invention may be briefly described as a method for drilling a well in which there is circulated down a hollow drill string, having a drill bit on its lower end, and up the annulus between the drill string and the wall of the well while rotating the hollow drill string, an aqueous solution of a salt selected from the group consisting of sodium and calcium chloride containing from about 8 to about 16 pounds per barrel of a lignin sulfonic acid salt whereby a filter cake of the lignin sulfonic acid salt is built up on the wall of the well. As the drilling fluid circulates to the wellhead, any suspended chips in the circulated fluid are removed and then there is continually added to the circulated fluid a sufficient amount of the lignin sulfonic acid salt to maintain the amount of lignin sulfonic acid salt in the circulated solution in the range from about 8 to about 16 pounds per barrel and to replace that forming the filter cake whereby increased drilling rates are obtained.

In accordance with the present invention, water may be the aqueous solution and the lignin sulfonic acid salt may be added in amounts of from 8 to 16 pounds per barrel thereto to improve the water loss characteristics of the aqueous fluid. The lignin sulfonic acid salt may suitably be calcium or sodium lignosulfonate or may be ferrochrome lignosulfonate. Other lignin sulfonic acid salts may be used. The lignin sulfonic acid salt is suitably employed in an amount in the range from about 8 to about 16 pounds per barrel of the aqueous solution with the preferred amount being about 12 pounds per barrel of the aqueous solution.

It is desirable and a feature of the present invention to remove suspended chips from the aqueous solution. These suspended chips may be in the aqueous solution as a result of the drilling operation. Accordingly, it is a feature of the present invention that the suspended chips will be substantially removed from the aqueous solution and this may be done by settling, precipitation, filtering, straining, or centrifugation or a combination of these several methods. It will be desirable to remove substantially all of the suspended chips but a small amount may be tolerated from a trace up to about 5% by volume of suspended chips.

The filter cake forming on the wall of the well is substantially the lignin sulfonic acid salt and as a result it is necessary to continually add lignin sulfonic acid salt to the circulated solution at the wellhead to replace that which goes to form the filter cake on the wall of the well bore. It will be desirable to add from about 8 to about 16 pounds of the lignin sulfonic acid salt to the circulating solution at the wellhead after removal of the suspended chips. It is contemplated that part of the filter cake may be comprised of chips resulting from the suspension of the drill chips in the aqueous solution.

The present invention will be further illustrated by reference to the drawing in which the sole FIGURE illustrates a preferred mode.

Referring now to the drawing, numeral 11 designates a well bore drilled from the earth's surface 12 by a hollow drill string 13 having a drill bit 14 attached to the lower end of the drill string 11. The drill bit may be a rock bit or may be a drag bit or suitably may be one having rollers or conical cutters. The drill string 13 extends up the floor 15 of a derrick 16 and through a rotary table 17 which is rotated by means not shown. The drill string is suspended by a block 18, hoisting lines 19 and swivel 22. Swivel 22 is connected by a flexible line 23 to a mud pump 24. The mud pump 24, in turn, connects by suction line 25 to a basin 26 divided into two parts by a wier 27. In the section 28 of the settling basin 26, the aqueous suspension is introduced thereto by returns ditch 29 carrying any chips resulting from the drilling operation. The section 28 is of sufficient size to provide a residence time for settling of the chips as a layer 30 in the bottom of the basin 26. The settled solution overflows the wier 27 into the section 31 where it is substantially free of chips, further amounts dropping out into the layer 32. The solution is filtered through a strainer 33 before flowing by way of lines 25 and 23 down the hollow drill stem 13 and out through the eyes 34 of the drill bit 14 and thence up the annulus 35 to the returns ditch 29.

In accordance with the present invention, a filter cake 36 comprised substantially of the lignin sulfonic acid salt is formed on the wall of the well 11. Since the lignin sulfonic acid salt goes to form the filter cake 36, it is necessary to add continually lignin sulfonic acid salt to replace that deposited as filter cake 36. To this end tank 37, containing lignin sulfonic acid salt as a suspension, solution, or as a solid, is provided and the lignin sulfonic acid salt is added by way of line 38 controlled by valve 39 to line 25 and thence to the circulating system. Since some of the aqueous solution may be lost during the circulation, provision is made to add aqueous solution from tank 40 through line 41 controlled by valve 42. Thus, from the description taken with the drawing, it will be seen that substantially improved drilling rates are possible since suspended chips are continually removed from the circulating aqueous solution and lignin sulfonic acid salt is continually added to enhance the filtration qualities of the fluid.

Drilling with nonsolids fluid such as water results in higher penetration rates than are possible using a fluid originally containing suspended clay mud solids as is ordinarily employed. For example, penetration rates while drilling with the conventional mud are only from about 40% to 60% of that obtainable when water is the drilling fluid. The use of water alone, however, is limited in many areas because formation pressures are uncontrollable with unweighted fluids; the water is easily lost to permeable formations and hole trouble is excessive when using water alone.

In accordance with the present invention, a drilling fluid which is initially free of mud solids and which is substantially free of chips is used and in the present invention fresh water or water saturated with either calcium chloride or sodium chloride is used. The weight of saturated calcium chloride solutions is approximately 12 pounds per gallon which satisfies weight requirements for about 80% of the wells drilled in the Gulf Coastal area. The weight of saturated sodium chloride solutions is about 10 pounds per gallon, which satisfies the weight requirements for most wells. However, the weight of fresh water is only 8.33 pounds per gallon and may be satisfactory only in those areas where subnormal pressures exist. Thus, the aqueous solution may have a weight in the range from about 8.5 to about 12 pounds per gallon. However, either fresh water or saturated solutions of sodium or calcium chloride are not satisfactory in that the solutions may be rapidly lost to permeable formations. Therefore, in accordance with the present invention, lignin sulfonic acid salts such as ferrochrome lignosulfonates, sodium and calcium lignosulfonates, and other lignin sulfonic acid salts are employed. By providing the amount recited of the lignin sulfonic acid salt in the aqueous solution, excessive hole trouble is eliminated. If formation clays are penetrated which hydrate on contact with fresh water and cause trouble by sloughing into the hole, the drilling fluid may be changed from water to a saturated sodium or calcium chloride solution. Therefore, in accordance with the present invention, it is contemplated that drilling with water which contains a lignin sulfonic acid salt may be used until hydratable clays are encountered in the drilling operation. Thereafter a saturated sodium chloride or calcium chloride solution containing the lignin sulfonic acid salt could be used.

In practicing the present invention, the hollow drill string carrying a drill bit on its lower end is rotated to make a hole and there is circulated in the drilling operation the aqueous solution containing the stated amount of the lignin sulfonic acid salt with the chips being continually removed at the wellhead and with the lignin sulfonic acid salts being continually added. By virtue of adding the lignin sulfonic acid salts, a filter cake is built up on the wall of the well and by virtue of removing substantially all of the suspended chips, drilling is conducted with water, which gives improved drilling rates of anywhere from 40% to 60% improvement over that for the conventional drilling fluids.

The present invention is therefore quite advantageous and useful.

The nature and objects of the present invention having been completely described and illustrated, what I wish to claim as new and useful and secure by Letters Patent is:

1. A method for drilling a well which comprises circulating down a hollow drill string having a drill bit on its lower end and up the annulus between the drill string and the wall of said well while rotating said hollow drill string an aqueous solution of a salt selected from the group consisting of sodium and calcium chloride containing from about 8 to about 16 pounds per barrel of a lignin sulfonic acid salt, said solution being initially free of mud solids, whereby a filter cake of said lignin sulfonic acid salt is built up on the wall of said well, substantially removing any suspended chips from said circulated aqueous solution at the wellhead, and continually adding said lignin sulfonic acid salt to said circulated solution at the wellhead to maintain the amount of said lignin sulfonic acid salt in said circulated solution in the range from about 8 to about 16 pounds per barrel and to replace that forming said filter cake whereby increased drilling rates are obtained.

2. A method in accordance with claim 1 in which the aqueous solution has a weight in the range from about 8.5 to about 12 pounds per gallon.

3. A method for drilling a well which comprises circulating down a hollow drill string having a drill bit on its lower end and up the annulus between the drill string and the wall of said well while rotating said hollow drill string a saturated aqueous solution of a salt selected from the group consisting of sodium and calcium chloride containing from about 8 to about 16 pounds per barrel of a lignin sulfonic acid salt, said solution being initially free of mud solids, whereby a filter cake of said lignin sulfonic acid salt is built up on the wall of said well, substantially removing any suspended chips from said circulated aqueous solution at the wellhead, and continually adding said lignin sulfonic acid salt to said circulated solution at the wellhead to maintain the amount of said lignin sulfonic acid salt in said circulated solution in the range from about 8 to about 16 pounds per barrel and to replace that forming said filter cake whereby increased drilling rates are obtained.

4. A method for drilling a well which comprises circulating down a hollow drill string having a drill bit on its lower end and up the annulus between the drill string and the wall of said well while rotating said hollow drill string an aqueous solution containing from about 8 to about 16 pounds per barrel of a lignin sulfonic acid salt, said solution being initially free of mud solids, whereby a filter cake of said lignin sulfonic acid salt is built up on the wall of said well, substantially removing any suspended chips from said circulated aqueous solution at the wellhead, and continually adding said lignin sulfonic acid salt to said circulated solution at the wellhead to maintain the amount of said lignin sulfonic acid salt in said circulated solution in the range from about 8 to 16 pounds per barrel and to replace that forming said filter cake whereby increased drilling rates are obtained.

5. A method for drilling a well which comprises circulating down a hollow drill string having a drill bit on its lower end and up the annulus between the drill string and the wall of said well while rotating said hollow drill string an aqueous solution of sodium chloride containing from about 8 to about 16 pounds per barrel of a lignin sulfonic acid salt, said solution being initially free of mud solids, whereby a filter cake of said lignin sulfonic acid salt is built up on the wall of said well, substantially removing any suspended chips from said circulated aqueous solution at the wellhead, and continually adding said lignin sulfonic acid salt to said circulated solution at the wellhead to maintain the amount of said lignin sulfonic acid salt in said circulated solution in the range from about 8 to about 16 pounds per barrel and to replace that forming said filter cake whereby increased drilling rates are obtained.

6. A method for drilling a well which comprises circulating down a hollow drill string having a drill bit on its lower end and up the annulus between the drill string and the wall of said well while rotating said hollow drill string an aqueous solution of calcium chloride containing from about 8 to about 16 pounds per barrel of a lignin sulfonic acid salt, said solution being initially free of mud solids, whereby a filter cake of said lignin sulfonic acid salt is built up on the wall of said well, substantially removing any suspended chips from said circulated aqueous solution at the well head, and continually adding said lignin sulfonic acid salt to said circulated solution at the wellhead to maintain the amount of said lignin sulfonic acid salt in said circulated solution in the range from about 8 to about 16 pounds per barrel and to replace that forming said filter cake whereby increased drilling rates are obtained.

7. A method for drilling a well which comprises circulating down a hollow drill string having a drill bit on its lower end and up the annulus between the drill string and the wall of said well while rotating said hollow drill string an aqueous solution of a salt selected from the group consisting of sodium and calcium chloride containing from about 8 to about 16 pounds per barrel of ferrochrome lignosulfonate, said solution being initially free of mud solids, whereby a filter cake of said ferrochrome lignosulfonate is built up on the wall of said well, substantially removing any suspended chips from said circulated aqueous solution at the wellhead, and continually adding said ferrochrome lignosulfonate to said circulated solution at the wellhead to maintain the amount of said ferrochrome lignosulfonate in said circulated solution in the range from about 8 to about 16 pounds per barrel and to replace that forming said filter cake whereby increased drilling rates are obtained.

References Cited in the file of this patent

UNITED STATES PATENTS

| | | |
|---|---|---|
| 2,491,436 | Barnes | Dec. 13, 1949 |
| 2,870,990 | Bergey | Jan. 27, 1959 |
| 2,935,504 | King et al. | May 3, 1960 |